(12) United States Patent
Xia et al.

(10) Patent No.: US 12,391,231 B2
(45) Date of Patent: Aug. 19, 2025

(54) ENGINE AND INTEGRATED HYBRID POWERTRAIN

(71) Applicant: Cummins Inc., Columbus, IN (US)

(72) Inventors: Chunyi Xia, Columbus, IN (US);
Andrew W. Osburn, Nashville, IN (US); David B. Snyder, Greenwood, IN (US); Adam C. Cecil, Columbus, IN (US); Anant Puri, Greenwood, IN (US); Ming-Feng Hsieh, Nashville, IN (US); Timothy Shipp, Seymour, IN (US)

(73) Assignee: Cummins Inc., Columbus, IN (US)

( * ) Notice: Subject to any disclaimer, the term of this patent is extended or adjusted under 35 U.S.C. 154(b) by 267 days.

(21) Appl. No.: 18/110,294

(22) Filed: Feb. 15, 2023

(65) Prior Publication Data
US 2023/0264672 A1    Aug. 24, 2023

Related U.S. Application Data

(60) Provisional application No. 63/313,614, filed on Feb. 24, 2022.

(51) Int. Cl.
*B60W 20/15* (2016.01)
*B60W 10/06* (2006.01)
*B60W 10/08* (2006.01)

(52) U.S. Cl.
CPC ............ *B60W 10/06* (2013.01); *B60W 10/08* (2013.01); *B60W 20/15* (2016.01); *B60W 2710/0605* (2013.01); *B60W 2710/0666* (2013.01); *B60W 2710/0677* (2013.01)

(58) Field of Classification Search
CPC ...... B60W 10/06; B60W 10/08; B60W 20/15; B60W 2710/0605; B60W 2710/0666; B60W 2710/0677
See application file for complete search history.

(56) References Cited

U.S. PATENT DOCUMENTS

| | | | | |
|---|---|---|---|---|
| 7,077,223 B2 * | 7/2006 | Kubodera | ............. | B60W 20/00 180/65.225 |
| 10,077,728 B1 * | 9/2018 | Ren | ........ | B60W 20/13 |
| 2003/0160455 A1 * | 8/2003 | Hu | ........ | B60W 10/06 290/40 C |
| 2003/0217877 A1 * | 11/2003 | Tatara | .......... | B60K 6/485 903/914 |

* cited by examiner

*Primary Examiner* — Edwin A Young
(74) *Attorney, Agent, or Firm* — Faegre Drinker Biddle & Reath LLP

(57) ABSTRACT

Provided is a system having a hybrid powertrain having a piston internal combustion engine, and a motor/generator, and the motor generator being coupleable to a clutch and thereby a gearbox, the engine further being equipped with a valvetrain control system operable to change the engine valve operation between a first mode in which the engine can operate in a conventional internal combustion mode and a second mode in which pumping losses are reduced when the engine is not operating in a conventional internal combustion mode.

19 Claims, 3 Drawing Sheets

ENGINE AND INTEGRATED HYBRID POWERTRAIN

CROSS-REFERENCE TO RELATED APPLICATIONS

The present application claims priority to U.S. Provisional Application Ser. No. 63/313,614, entitled "ENGINE AND INTEGRATED HYBRID POWERTRAIN," filed on Feb. 24, 2022, the entire disclosure of which being expressly incorporated herein by reference.

BACKGROUND OF THE INVENTION

This invention relates to hybrid powertrains for vehicles having hybrid electric and combustion engine powertrains.

In current hybrid architectures, it is common to have an electric machine which can act as both a motor or generator to either receive electrical power and generate motive force (typically rotational force) or receive motive force and generate electrical power. The latter mode may be used in a regenerative braking application to help retard a vehicle and recover kinetic energy from the vehicle to put it into an electrical energy store. Typically, the motor/generator is combined with an electrical store such as a chemical battery which may be recharged from grid power and/or from the motor/generator component.

These components are typically also combined with a combustion engine such as an internal combustion engine and motive power for the vehicle may be produced from the internal combustion engine alone, the motor and electrical energy store alone, or some combination of both.

It is conventionally known to locate the motor/generator relative to the vehicle powertrain (engine, transmission/gearbox and final drive) in several different positions. These have been typically classed as P0 through P4.

In a P0 configuration, the motor/generator is typically connected to the internal combustion engine or the front of the internal combustion engine through a belt drive and the motor generator will typically be an integrated starter generator. In a P1 configuration the motor/generator is connected directly to the internal combustion engine or at the rear of the internal combustion engine in front of any clutch or torque converter components running out to a gearbox. In a P2 configuration, the motor generator is conventionally located between the internal combustion engine and the transmission, and the internal combustion engine can be mechanically disconnected or decoupled from the transmission and motor/generator combination, as shown, for example, in FIG. 1.

In a P3 configuration, the motor/generator is located at the rear of the transmission before a differential and in a P4 configuration, typically the motor/generator is directly mechanically coupled to the rear axle and drives this directly.

With reference to FIG. 1, in a conventional P2 configuration, an internal combustion engine 2 is coupled via a clutch 4 to a gearbox 6 which also has a motor generator 8 coupled to it. This configuration will typically also have a system control unit 10 which determines operation of the clutch 4, and the motor generator and gearbox ratios in order to provide an appropriate balance of torque demanded from the driver of the vehicle, and also electrical energy consumption from the energy store (not shown). At the rear of the gearbox 6, torque is passed to a differential 12, which passes drive to the driven wheels 14. It will be appreciated that although the drawings show a longitudinal engine orientation, other orientations such as transverse, are also possible. The drawings are simply intended to show the logical order in which the components transmit torque to the driven wheels and are not intended to denote any particular locations or orientations of the components.

In such a configuration, it is desirable to be able to operate the vehicle in electric-only mode in which the internal combustion engine 2 is inoperable and does not rotate. This is typically achieved by activating the clutch 4 to disengage the engine from the powertrain so that the motor/generator 8 can continue to drive the gearbox 6 and therefore the differential 12.

However, there are several disadvantages of this P2 configuration. Significantly, in order to make such a system operate well, it is necessary for the internal combustion engine control systems, the gearbox control systems and the overall clutch and motor generator systems to be fully integrated with data communication and cooperation coded into them. That is, they need to be interoperable. For example, as the clutch 4 is engaged and disengaged and the internal combustion engine 2 spun up and down, it is necessary to synchronise these speeds and gearbox ratios in order to avoid a noticeable torque discontinuity occurring when the electric and internal combustion engine drivetrains are switched between the modes where they are used together, and/or individually.

Similarly, it will be noted that the internal combustion engine 2, conventionally does not only provide motor power for the vehicle but also typically will have ancillary devices such as low voltage generators for lighting etc. air conditioning pumps and power steering pumps which are driven directly by it or via belt connections. In such an arrangement, when the internal combustion engine 2 is brought to a standstill, all of these ancillary systems cease to receive power and stop functioning. Some of these systems may be replaced with electrically driven systems or even duplicated with electrically driven systems.

Alternatively, the engine may be allowed to continue to rotate just to drive these systems. In all cases, this generates additional weight and/or drivetrain losses, which are undesirable.

In summary, several challenges have been observed which limit the P2 powertrain arrangement for production:
1. Such an architecture requires a significant amount of powertrain, transmission, and engine redesigns in order to integrate the MG with the transmission, distribute power between the engine 2 and MG 8, and enable EV drive (accessory component electrifications are required because the engine may not rotate with the driveshaft). This issue is especially challenging/time consuming/cost intensive when different suppliers are involved to develop the engine and transmission and there is no standard to integrate the controls of the engine, MG, and transmission, between suppliers.
2. To achieve complete powertrain optimization, the engine, MG, and transmission need to be optimized together (both design and controls). Such integration has been very challenging in practice due to system complexity and product boundary limits between engine and transmission/powertrain suppliers. Many P2 demo experiences have shown poor drivability and lower-than-expected fuel economy
3. Due to lack of "standards" for Hybrid powertrain integration, different ECM-TCM/SCM communication interfaces and control features need to be developed for the powertrains of different suppliers. This significantly increases the development and maintenance costs from engine and powertrain suppliers.

It is thus desirable to find a better way to integrate an internal combustion engine with a motor/generator and transmission/gearbox, in a hybrid combustion engine/battery electric vehicle.

SUMMARY OF THE INVENTION

In a first aspect the invention provides a hybrid powertrain having a piston internal combustion engine, and a motor/generator, and the motor generator being coupleable to a clutch and thereby to a gearbox, wherein the motor/generator is coupled directly to the engine, the engine further being equipped with a valvetrain control system operable to change the engine valve operation between a first mode in which the engine can operate in a conventional internal combustion mode and a second mode in which pumping losses are reduced when the engine is not operating in a conventional internal combustion mode.

The powertrain may have a motor/generator which is coupled permanently to the engine such as in a P0 or P1 architecture, or may be used in a P2 architecture with a clutch or other means of decoupling torque, between the engine and M/G.

In this way, the engine (typically an internal combustion engine—ICE) may be rotated with minimal losses during a pure electric or overrun/motoring mode. Thus engine ancillaries do not need to be redesigned as these will rotate with the engine and furthermore the transmission or gearbox design and clutch control does not need to be changed from a conventional engine. The entirety of the hybrid operation is under the control of the engine designer which means that design boundaries between suppliers are not violated. This has significant simplification implications in terms of interoperability between control systems, which in turn greatly improves the speed and cost of designing a hybrid powertrain into a vehicle.

In a second aspect, the invention provides a valvetrain control system coupleable to the valvetrain of an internal combustion engine and operable to receive commands from a hybrid powertrain controller and to cause actuation of the valvetrain to put the valvetrain into a mode which responsive to a command from the hybrid powertrain controller, reduces engine pumping losses during rotation of the engine.

In a third aspect, the invention provides a method of operating a hybrid powertrain having an internal combustion engine coupled to a motor/generator and a valvetrain controller operable to selectively open and close the engine valves, the method comprising the steps of receiving a command to put the powertrain into a low loss mode, and responsive to the low-loss mode command, actuating the valves to reduce pumping losses in the engine as it rotates.

The invention also includes computer program product aspects.

BRIEF DESCRIPTION OF THE DRAWINGS

Embodiments of the invention will now be described by way of example, with reference to the drawings in which.

DETAILED DESCRIPTION OF THE INVENTION

Figure 2:
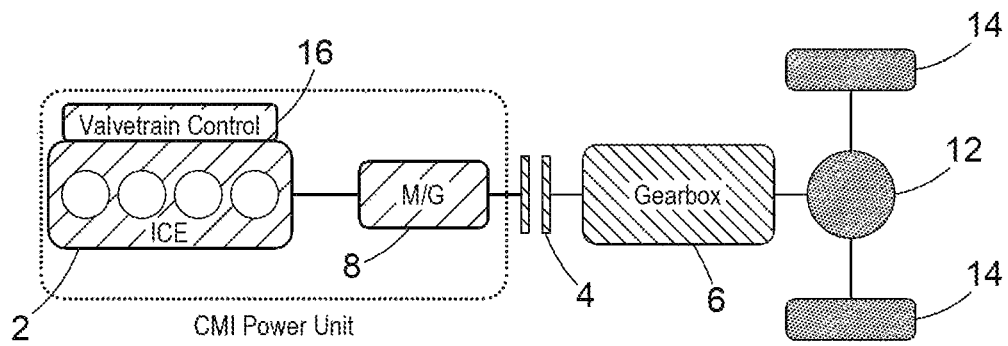
FIG. 2 is a schematic diagram of a modified Hybrid Powertrain layout.

With reference to FIG. 2, the powertrain may be reconfigured from the conventional P2 layout, so that the motor generator is coupled directly to the internal combustion engine thus meaning that the gearbox 6 may be separated from the motor generator and internal combustion engine components via the clutch 4. Previously, this type of configuration has been avoided because it means that the internal combustion engine 2 will always rotate with the motor generator 8 which means that losses from rotation of the internal combustion engine will reduce the overall efficiency of the system. These losses typically would be pumping losses from the movement of the pistons in the respective cylinders of the internal combustion engine 2, and also frictional losses from the rotating components, primarily the pistons in the cylinder bores—since most other rotating parts are well lubricated and generate little friction.

The skilled person will appreciate that the reference to clutch, could include torque converter or any other apparatus which can allow slippage or disengagement of torque between two rotating components.

In this new configuration, instead of having a clutch 4 disengage the engine 2 from the rest of the powertrain when the engine is not required, a valvetrain device 16 is used to reduce the engine motoring torque and/or friction to achieve a similar result to disengagement of the clutch 4 in the prior art P2 configurations. In other words, the valvetrain device allows the engine to rotate in motoring mode when it is not generating power, with minimal losses.

The valvetrain device 16 operates the engine inlet and/or exhaust valves to reduce losses from rotating the engine 2. The engine typically would be rotated either during deceleration modes by the driven wheels 14 rotating through the gearbox which ideally would also rotate the motor generator 8 in order to restore charge back to the battery store. Or, in an acceleration mode, in electric only mode, would be rotated directly by the motor generator 8. Thus, in the configuration of FIG. 2, it is likely that in most operating modes, the internal combustion engine 2 will continue to rotate. However, in only some modes, will the internal combustion engine be operating in a conventional combustion mode using fuel to generate power.

It will be noted that by rotating the engine in most modes, the ancillary devices which are coupled to it, for example, with direct drive from the crankshaft or belt drive, also continue to rotate, meaning that no special design characteristics need to be included in order to cause functions such as air conditioning and power steering compressors to continue to operate a mode in which the engine is not generating power. This greatly simplifies design of ancillary systems.

Furthermore, it will be noted that in the configuration of FIG. 2, the transmission/gearbox 6 can be of entirely conventional design and needs no particular integration with the internal combustion engine and motor generator components. Furthermore, because the internal combustion engine is rotating in most cases, the need to synchronise motors, gearboxes and internal combustion engine as these components are activated and deactivated in order to avoid noticeable torque discontinuities, is greatly mitigated or entirely removed.

Figure 1:
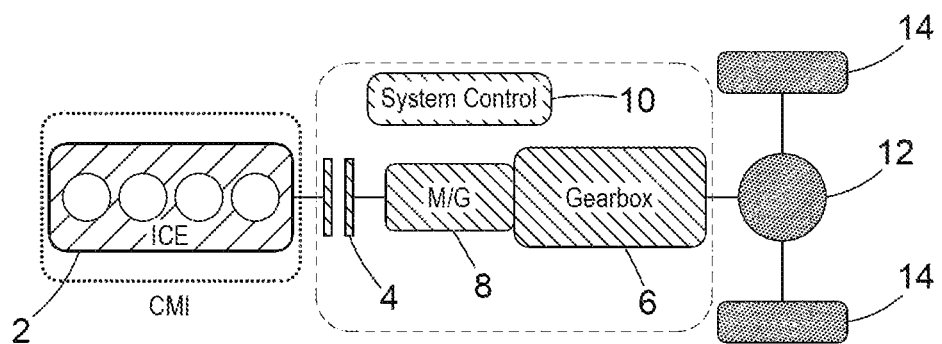
FIG. 1 is a schematic diagram of a conventional P2 Hybrid Powertrain layout.

Typically, the valvetrain device 16 can be either a cylinder decompression actuator (which keeps intake and/or exhaust valves open so that there is no compression in the cylinders as the pistons reciprocate) or a cylinder deactivation actuator (which keeps the intake and exhaust valve closed during intake and exhaust cycles). When the valvetrain device is actuated it reduces engine pumping work during engine motoring and thus the powertrain performs similarly to when it is disengaged by the clutch 4 of the prior art configuration of FIG. 1. When the valvetrain device operates as a decompression device (intake and/or exhaust valves are maintained open) not only is the degree of pumping losses reduced but also frictional losses in the cylinder bores are reduced due to lower cylinder pressures. The skilled person will appreciate that for the purposes of this invention, a subset of cylinders or indeed only one cylinder, may be deactivated or decompressed, and any combination of valves being deliberately held closed or open is encompassed in the present invention.

Figure 3:
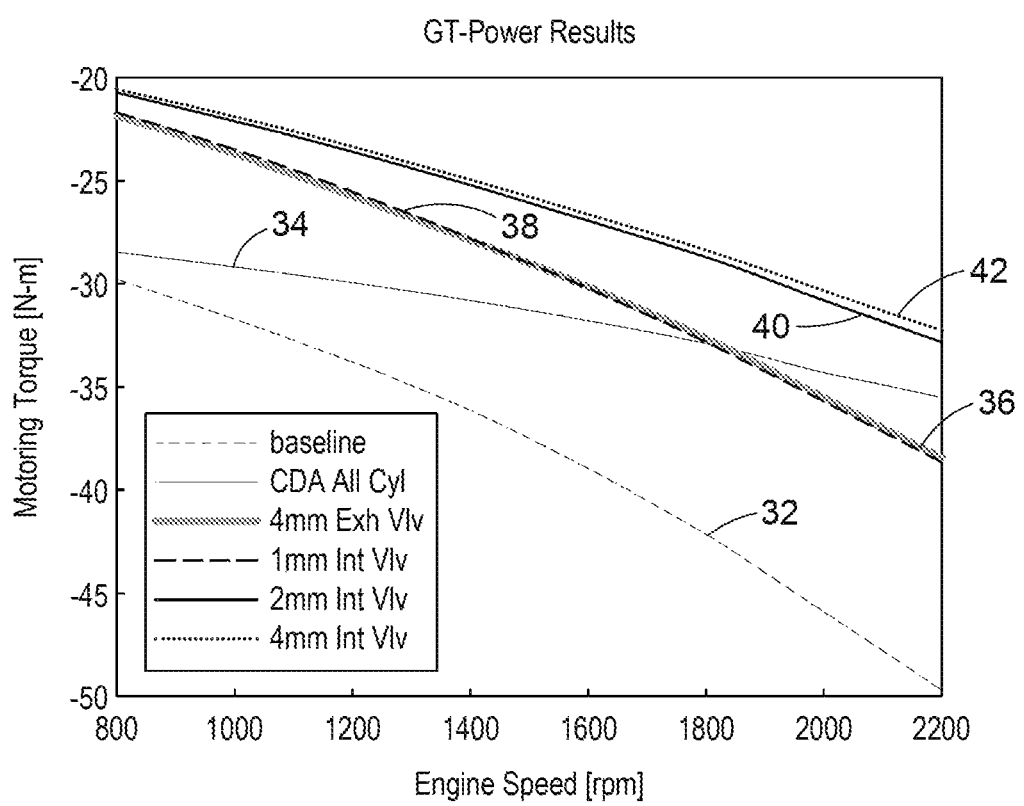
FIG. 3 is a plot of engine torque in motoring mode against engine speed with different valvetrain configurations.

With reference to FIG. 3, typical results of these different modes are shown. The line 32 is a plot of torque required to rotate the engine with no special valvetrain control (i.e. the valves open and close in typical phases which would be used to enable a typical induction and exhaust operation through the inlet and exhaust manifolds via the valves). The line 34 shows the torque requirement for a cylinder deactivation mode in which all valves are maintained closed throughout reciprocation of the piston in each cylinder. It will be seen that this is significantly more efficient than the base line mode 32 with, in this example, approximately 28 Nm less force required to rotate the engine. The skilled person will of course appreciate that work is done by rotating the engine against this torque, which equates to a power loss in the overall system.

The remaining four plots, 36, 38, 40 and 42 respectively, show an exhaust valve open by four millimetres which is the distance between the valve and the valve seat and plot 38 shows a similar effect with a one millimetre opening for the inlet valve. The remaining plots 40 and 42 show the effects of opening the inlet valve two millimetres and four millimetres respectively. It will be seen that in this particular modelling effect, opening the inlet valve to four millimetres has only a minimal efficiency improvement relative to opening the inlet valve by two millimetres.

The modelling plot does not take any account of reduced friction with the valves open and thus real world results will be even better. The plot does however show proof that the cylinder deactivation or cylinder decompression all produce an increase in efficiency when the engine is being motored but is not itself generating power, for example, because fuelling (and in the case of the ignition combustion engines, ignition cycles) are deactivated. Thus, in all cases, introducing valvetrain control into the hybrid architecture means that the engine can be motored with relatively small losses in the overall system and the advantages of simplification of control system integration and power to ancillary devices for the vehicle is gained.

Figure 4:
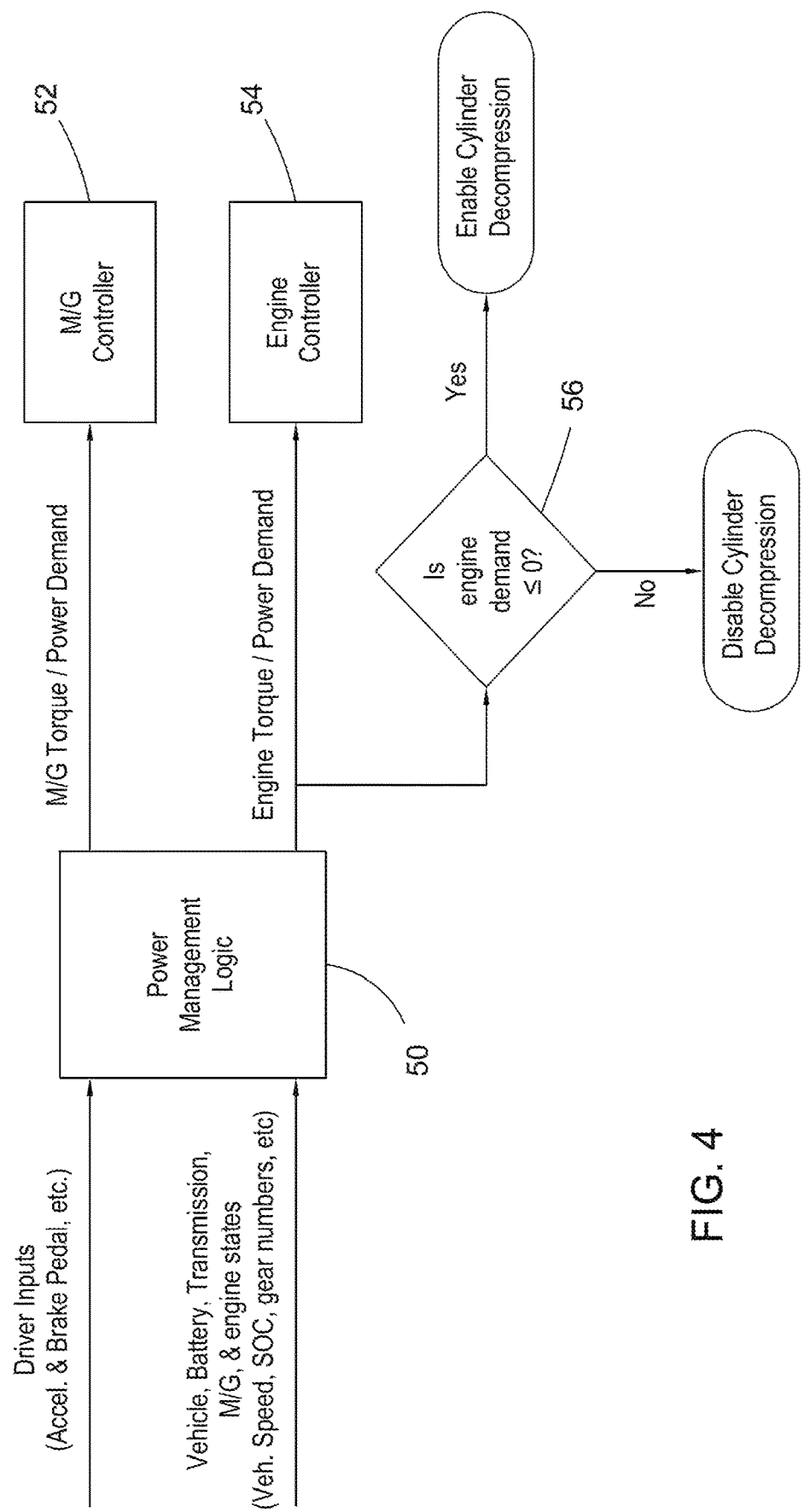
FIG. 4 is a schematic diagram showing a valvetrain control system and a flow-chart showing the valvetrain control logic.

With reference to FIG. 4, the valvetrain control 16 is operated according to vehicle parameters, such as battery, engine and transmission status, and also driver inputs (typically, accelerator and braking inputs) and the valvetrain is typically operated dependent on a torque/power requirement for the ICE 2.

In this control logic, there is power management logic block 40 which receives driver inputs (typically torque demand as indicated e.g. by an accelerator pedal position) along with vehicle, transmission 6, M/G 8, and ICE 2 states. Typical parameters for this latter set include vehicle speed, battery state of charge, and gear number or ratio. Based upon that input, the logic block 50 decides a "torque split", that is, what portion of the driver demanded torque should be met with the M/G 8 and what portion should be met with the ICE 2. Accordingly, the logic block 50 has outputs to control a motor/generator controller 52 and an engine/ICE controller 54.

This much is generally conventional, but the system also controls the cylinder decompression described above.

FIG. 4 shows that the control system monitors the torque/power demanded from the ICE 2 and the cylinder decompression is enabled only if the engine demand is less than or equal to zero (step 56). Another equivalent way of defining this condition would be if engine fueling is equal to zero. Whilst engine demand less than or equal to zero is a necessary condition for cylinder decompression to be enabled, it is not necessarily a sufficient condition. Other conditions might also need to be satisfied. For example, if some fault in the cylinder decompression system has been detected, then cylinder decompression may still not be enabled—even if engine demand is less than or equal to zero. Also, the condition (engine demand less than or equal to zero) might also include hysteresis. For example, the condition needs to remain true for a certain period of time before the cylinder decompression in enabled, this introduces damping into the valvetrain control loop which mitigates oscillation to prevent valvetrain control being operated on/off too rapidly.

This control logic is applicable to the hybrid architecture described above and it is also applicable to a more conventional P2 hybrid architecture—one that still has a clutch between the engine & M/G and thus does not have a direct and permanent connection to the engine, but that also includes cylinder decompression technology. For example, such a system, when the engine demand is less than or equal to zero, might be controlled so as to leave the engine coupled (along with cylinder decompression being enabled) in some conditions. This then allows ancillary devices driven by the engine to continue to operate, as described above. Under other conditions, the clutch might be opened and the engine allowed to stop, as usual.

In summary, the advantages of the proposed architecture are:
1. The "power unit" (engine+MG+battery) is independent of transmissions and their manufacturers. The existing engine-based transmission interface and control can remain identical. The same "power unit" can be integrated with AMT, AT, or even manual transmission. An OEM can take the benefit of a Hybrid powertrain without changing transmissions.
2. Since the engine crankshaft does not physically disengage from the powertrain (engine continuously rotates like conventional engine based powertrain), most of the vehicle and engine accessories can stay unchanged, e.g. air compressor, coolant pump, and etc.
3. Potentially better drivability compared to transmission-integrated P2 due to EV mode to engine mode transmission does not required engine speed synch and clutch control. Since engine crank shaft rotates with drive shaft all the time, engine power can be engaged by controlling valve liftings to normal and starting fuelling.
4. Hybrid power optimization can be done by engine manufacturer completely. Since all the power sources are within the engine manufacturer product boundary, this enables the manufacturer to have full control of design, controls, and calibration optimization.

Besides these technological advantages, such an architecture can significantly reduce the development cost and time for an OEM for new transmission development and integration. The product ready-to-market time can also be shorter due to the only "new" part being the "power unit", which does not require extra integration works between different suppliers.

What is claimed is:

1. A hybrid powertrain having a piston internal combustion engine, and a motor generator, and the motor generator being coupleable to a clutch and thereby to a gearbox, the engine further being equipped with a valvetrain control system operable to change an engine valve operation between a first mode in which the engine is arranged to operate in a conventional internal combustion mode and a second mode in which pumping losses are reduced when the engine is not operating in the conventional internal combustion mode,
wherein the engine is prevented from operating in the second mode when a fault is detected in the valvetrain control system.

2. The powertrain as claimed in 1, wherein the motor generator is coupled permanently to the engine.

3. The powertrain as claimed in claim 1, wherein the valvetrain control system operates to maintain an inlet and exhaust valve open through multiple strokes of the engine.

4. The powertrain as claimed in claim 1, wherein the valvetrain control system operates to maintain an inlet valve open through multiple strokes of the engine.

5. The powertrain as claimed in claim 1, wherein the valvetrain control system operates to maintain an exhaust valve open through multiple strokes of the engine.

6. The powertrain as claimed in claim 1, wherein the valvetrain control system operates to maintain an inlet and exhaust valve closed through multiple strokes of the engine.

7. The powertrain as claimed in claim 1, wherein the engine is caused to operate in the second mode when the engine is being commanded to produce no power or torque.

8. The powertrain as claimed in claim 7, wherein the change from the first mode to the second mode is delayed by a predetermined time after the engine enters an engine state to produce no power or torque in response to the command to produce no power or torque.

9. The powertrain as claimed in claim 1, wherein the engine is caused to operate in the second mode when the engine is being operated in a no-fuelling or lower fuelling state in order to produce no, or minimal power.

10. A method of operating a hybrid powertrain having an internal combustion engine coupled to a motor generator and a valvetrain controller operable to selectively open and close engine valves, the method comprising:
receiving a command to put the powertrain into a low loss mode, and
responsive to the low loss mode command, actuating the engine valves to reduce pumping losses in the engine as it rotates;
wherein the engine is prevented from operating in the low loss mode when a fault is detected by the valvetrain controller.

11. The method as claimed in claim 10, wherein the motor generator is coupled permanently to the engine.

12. The method as claimed in claim 10, wherein the valvetrain controller operates to maintain an inlet and exhaust valve open through multiple strokes of the engine.

13. The method as claimed in claim 10, wherein the valvetrain controller operates to maintain an inlet valve open through multiple strokes of the engine.

14. The method as claimed in claim 10, wherein the valvetrain controller operates to maintain an exhaust valve open through multiple strokes of the engine.

15. The method as claimed in claim 10, wherein the valvetrain controller operates to maintain an inlet and exhaust valve closed through multiple strokes of the engine.

16. The method as claimed in claim 10, wherein the engine is caused to operate in the low loss mode when the engine is being commanded to produce no power or torque.

17. The method as claimed in claim 16, wherein actuating the engine valves in response to the low loss mode command is delayed by a predetermined time after the engine enters an engine state to produce no power or torque in response to the command to produce no power or torque.

18. The method as claimed in claim 10, wherein the engine is caused to operate in the low loss mode when the engine is being operated in a no-fuelling or lower fuelling state in order to produce no, or minimal power.

19. A non-transitory, computer-readable medium, storing instructions that, when executed by a computer operating a hybrid powertrain having an internal combustion engine coupled to a motor generator and a valvetrain controller operable to selectively open and close engine valves, causes the computer to perform the steps of:
receiving a command to put the powertrain into a low loss mode, and
responsive to the low loss mode command, actuating the engine valves to reduce pumping losses in the engine as it rotates;
wherein the engine is prevented from operating in the low loss mode when a fault is detected by the valvetrain controller.

* * * * *